United States Patent [19]

Janjua et al.

[11] 4,183,790

[45] Jan. 15, 1980

[54] ELECTROLYTIC METHOD OF PRODUCING AN ACTIVE COBALT ELECTRODE FOR THE EVOLUTION OF HYDROGEN

[75] Inventors: Mohammad B. I. Janjua, Pincourt; Rodney L. LeRoy, Pointe Claire, both of Canada

[73] Assignees: Noranda Mines Limited; The Electrolyser Corporation Ltd., both of Toronto, Canada

[21] Appl. No.: 909,727

[22] Filed: May 26, 1978

[30] Foreign Application Priority Data

Jul. 22, 1977 [CA] Canada .................................. 283384

[51] Int. Cl.² .......................... C25B 11/04; C25D 3/12; C25D 5/50
[52] U.S. Cl. .................................. 204/48; 204/37 R; 204/290 R; 204/129; 429/40
[58] Field of Search .................... 204/43 T, 48, 290 R, 204/292, 293, 280, 37 R

[56] References Cited

U.S. PATENT DOCUMENTS

| | | | |
|---|---|---|---|
| 3,338,804 | 8/1967 | Fischer | 204/48 |
| 3,926,844 | 12/1975 | Benczur-Urmossy | 204/290 R |

FOREIGN PATENT DOCUMENTS 712570  6/1965  Canada ...................................... 204/48

OTHER PUBLICATIONS

Sullivan, Plating (Feb. 1975), pp. 139-141.

Primary Examiner—Howard S. Williams
Attorney, Agent, or Firm—Fleit & Jacobson

[57] ABSTRACT

A method of producing a cobalt plated electrode is disclosed. The method comprises subjecting an electrically conductive substrate to electrolytic plating in an aqueous bath containing cobalt ions and a reducing agent selected from the group consisting of hypophosphite salts, phosphite salts, formaldehyde and hydrazine in the concentration of 2 to 100 gpl. Ammonium ions and a weak complexing agent are preferably added to the bath. The current density is in the range of 0.2 to 150 mA/cm² and the temperature of the bath between 20° and 80° C.

18 Claims, 9 Drawing Figures

ELECTROLYTIC METHOD OF PRODUCING AN ACTIVE COBALT ELECTRODE FOR THE EVOLUTION OF HYDROGEN

This invention relates to a method of producing a cobalt plated electrode having a low overvoltage for the evolution of hydrogen and good stability in caustic electrolytes such as used in the electrolysis of water to produce hydrogen gas. Other possible applications of such electrodes are in chloroalkali cells of the diaphragm type and fuel cells in which hydrogen reduction is the anodic reaction.

Hydrogen and oxygen overvoltages are major contributors to energy inefficiency in commercial water electrolysers, hydrogen-based fuel cells, and chloroalkali cells of the diaphragm type. For example, in the unipolar electrolyser products sold by The Electrolyser Corporation, the anode-cathode potential is approximately 2.0 volts, only 1.2 volt of which is thermodynamically required for water decomposition. The combined oxygen and hydrogen overvoltages in these plants are between 500 and 700 mV at normal operating current densities.

The cathode material in most common use in alkaline electrolysers is mild steel, or iron. It is well known that in basic electrolyte this material has the lowest hydrogen overvoltage of any pure metal, with an overvoltage of approximately 400 mV at 100 mA/cm$^2$ and 25° C. The next lowest overvoltage obtainable on a pure metal is approximately 425 mV under the same conditions on cobalt, while for nickel the corresponding value is approximately 525 mV. For the best of these materials, iron, the hydrogen overvoltage is between 350 mV and 450 mV in the current density range at which most electrolysers are operated, between 40 and 200 mA/cm$^2$.

Reduction of this very large hydrogen overvoltage is a major objective of work to develop improved water electrolysers, hydrogen-based fuel cells, and chloroalkali cells of the diaphragm type. The energy efficiency, defined as the ratio of electrical energy entering to hydrogen energy leaving (in terms of the higher heating value of hydrogen), of an electrolyser plant operating at 2.0 volts is 74.5%. Reduction of the hydrogen overvoltage by 250 mV would increase this efficiency to 85.1%, corresponding to a 44% reduction in the energy loss.

Some active materials for reduction of hydrogen overvoltages have been proposed. For example, it is well known that platinum black is an active catalyst, and this material has been used as a catalyst for the hydrogen electrode. However, platinum and related noble metal materials are very costly, and electrochemical equipment must be operated at extremely high current densities to compensate for this cost. Such noble metal catalysts are not viable for electrolysers of conventional design, which typically operate at current densities between 40 and 200 mA/cm$^2$.

A technique of producing cathodes having low hydrogen overvoltage by plating iron, cobalt, or nickel from borohydrate-containing baths was described in German Offenlegungschrift No. 23 07 852 published on Sept. 5, 1974 although specific results for nickel only were disclosed. On the active nickel material, the hydrogen overvoltage at 100 mA/cm$^2$ and 30° C. was described as being approximately 190 mV. This is a 210 mV reduction from the value mentioned above at the same current density and temperature. However, a laboratory assessment of the active nickel electrode has revealed an increase in hydrogen overvoltage by more than 50 mV after 16 hours electrolysis. Applicant has also assessed the active iron and cobalt electrodes made from borohydrate baths and found that these electrodes showed some overvoltage benefit at lower current densities, but overvoltage values rose sharply above 20 mA/cm$^2$. The results of these overvoltage measurements, together with the relative instability of the borohydrate plating baths, indicate that the requirement for a stable, low overvoltage cathode material has not been fully satisfied by the above electrode preparation procedures.

It is therefore the object of the present invention to provide an electrode having a low hydrogen overvoltage while operating with good stability in caustic electrolytes, and which can be prepared by inexpensive and easily controlled techniques.

The method, in accordance with the invention, comprises subjecting an electrically conductive substrate to electrolytic plating in an aqueous bath containing cobalt ions, and a reducing agent selected from the group consisting of hypophosphite salts, phosphite salts, formaldehyde and hydrazine in the concentration of 2 to 100 gpl, at a temperature between 20° and 80° C.

The plating bath preferably includes ammonium ions and a complexing agent selected from the group consisting of sodium or potassium salts of organic acids such as oxalic, citric, tartaric, hydroxyacetic and succinic, polyhydroxyalcohols such as glycerine and glycol, and related compounds present at a concentration in the range of 10 to 200 gpl but preferably between 50 and 100 gpl.

The substrate is preferably made of mild steel although other materials such as nickel, may be desirable in electrochemical equipment operating at high temperature where steel would not be stable enough. Very high surface area substrates, such as fibrous graphite, sintered metals, conductive oxides, and substrates prepared by plating of alloys and subsequent dissolution of one component of the alloy, may be used.

The reducing agent is preferably sodium hypophosphite at a concentration in the range of 2 to 100 gpl, preferably 10 to 30 gpl.

The cobalt ions are preferably provided by a cobalt salt at a concentration of 5-150 gpl but preferably at 30 to 50 gpl.

The ammonium ions are preferably provided by ammonium chloride at a concentration of about 10-100 gpl but preferably at about 50 gpl.

The pH of the plating bath may be in the range of 3 to 10 and is preferably adjusted by HCl or NH$_4$OH addition to fall within the range of 5 to 7.

The temperature of the plating solution is normally in the range of 20° to 80° C., preferably 25° to 45° C.

The plating current density is normally in the range of 0.2 to 150 mA/cm$^2$ but preferably between 10 to 80 mA/cm$^2$.

Although not absolutely necessary, it is preferable to anneal the electrode after plating to releave the stress in the plated deposits and so improve the stability of the electrode.

It has also been found advantageous to plate by means of pulsed direct current to improve the adhesion of the plated deposits.

The invention will now be disclosed, by way of example, with reference to the following detailed description and the accompanying drawings in which.

Figure 8:
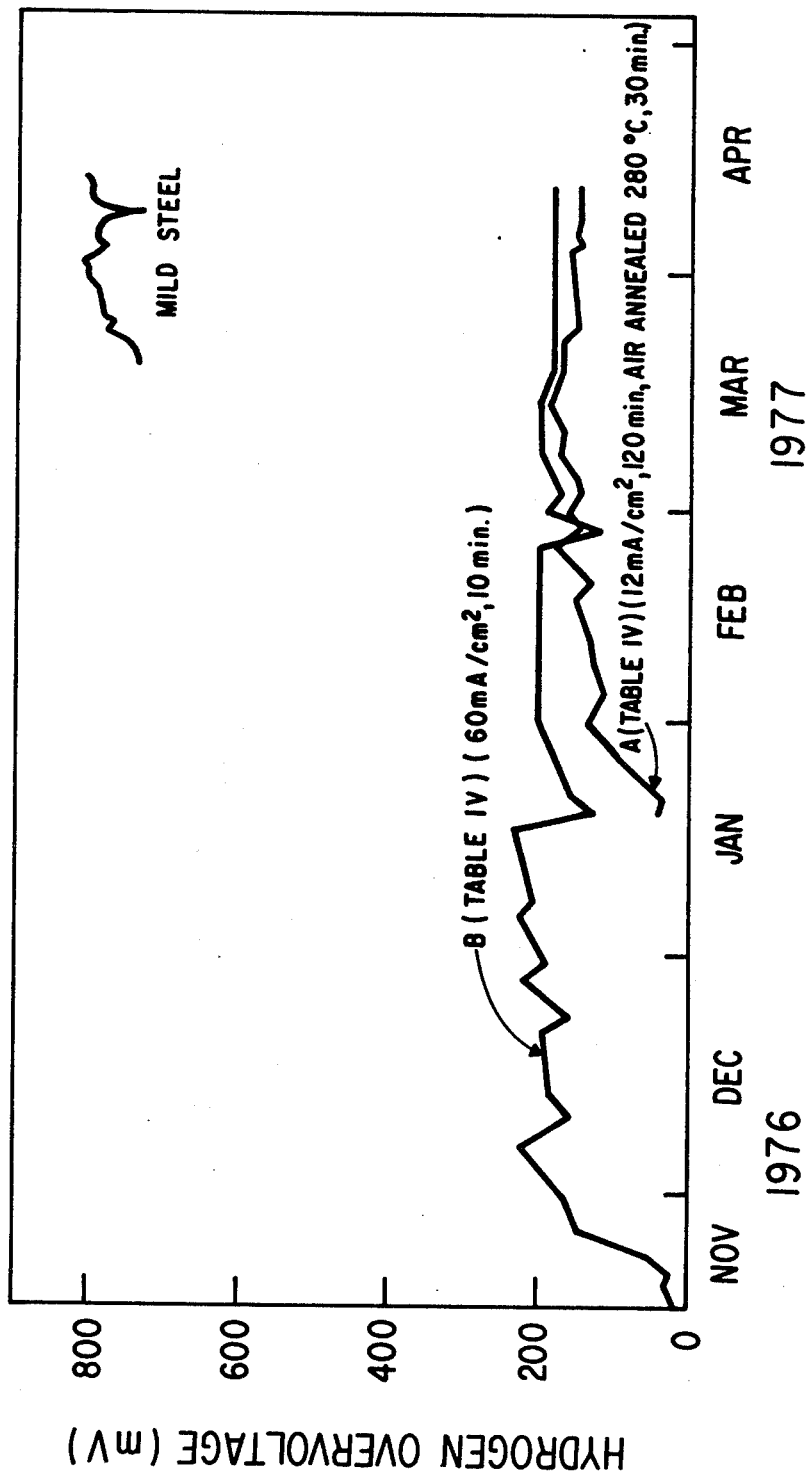
Figure 9:
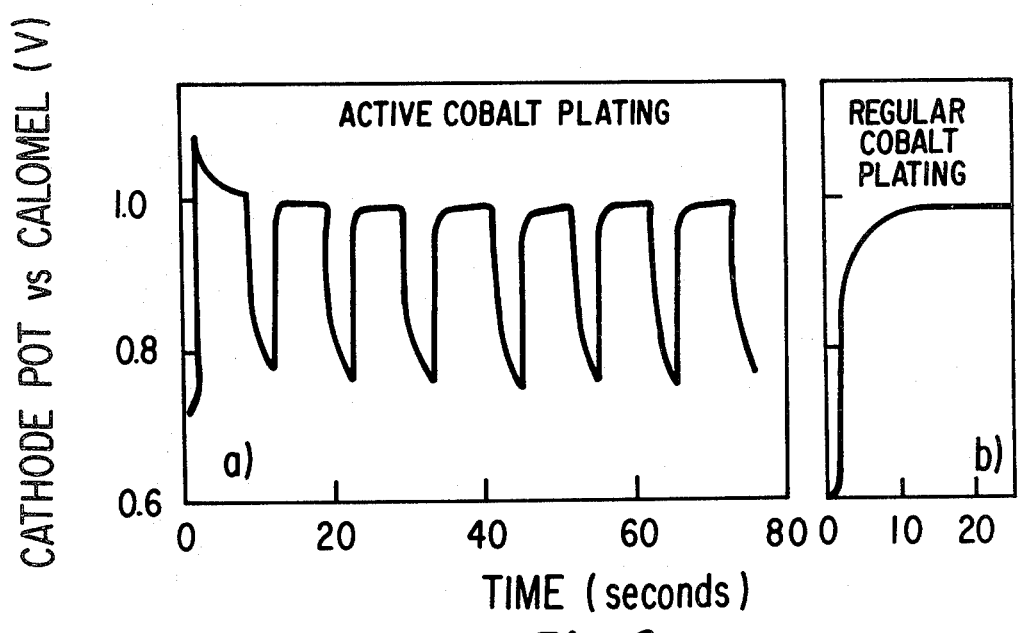

FIG. 8 illustrates variation of hydrogen overvoltages with time in long term evaluation of two of the active cobalt electrodes in accordance with the invention as compared with a mild steel electrode; and FIG. 9 illustrates variation of cathode potential with time following the onset of cobalt plating onto a mild steel electrode for an active cobalt composition in accordance with the invention plated with pulsed D.C. current as compared to a non-active cobalt plated with D.C. current at 24 mA/cm$^2$.

Figure 1:
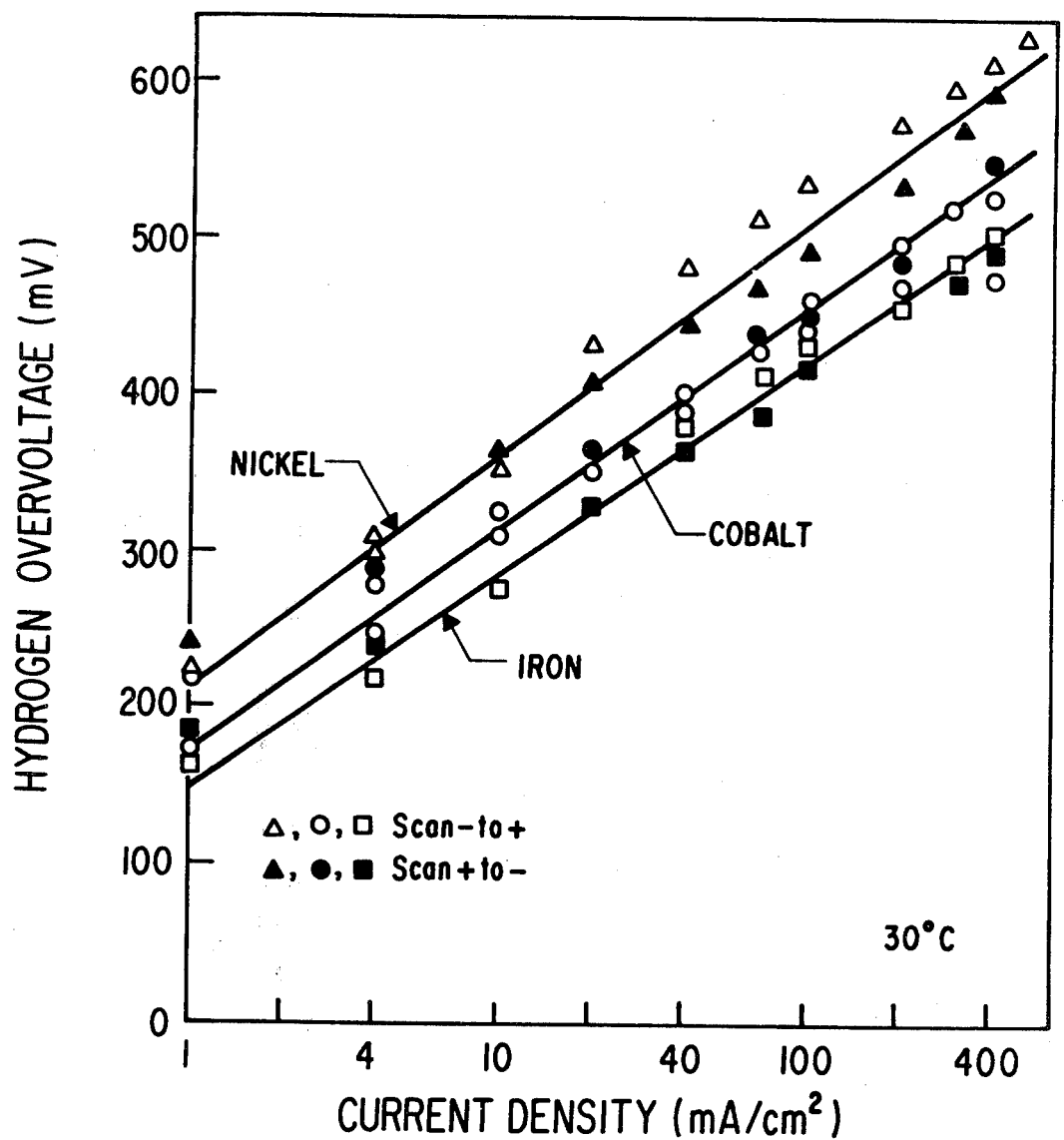
FIG. 1 illustrates the hydrogen overvoltages measured on pure iron, cobalt and nickel electrodes.

Referring to FIG. 1, there is shown the hydrogen overvoltages measured on pure iron, cobalt and nickel electrodes as a function of current density. The lines drawn are averages of anodic and cathodic scans. The electrolyte is 28% KOH at 30° C. From these results, it will be seen that, for the best of these materials, iron, the hydrogen overvoltage is between 350 mV and 450 mV in the current density range at which most electrolysers are operated, between 40 and 200 mA/cm$^2$.

A laboratory assessment of active nickel, cobalt and iron electrodes plated from borohydride baths, such as disclosed in the above mentioned Offenlegungschrift No. 23 07 852, was carried out. Plating baths were prepared by closely following the patent specification. For example, for nickel the bath contained 30 gpl NiCl$_2$.6H$_2$O, 385 ml/1 NH$_4$OH, and 3 gpl NaBH$_4$. Electroless plating was carried out at 25° C. for 22 hours. The plating baths prepared for all three metals were unstable, and contained large amounts of precipitate. No deposit could be obtained from the cobalt bath at 25° C. (as claimed in the patent specification), and heating to 75° C. was necessary. Results of cathodic polarization measurements carried out in 28% KOH electrolyte at 30° C. are summarized in FIG. 2. The nickel cathode was tested twice: shortly after plating (curve a), and after 16 hours electrolysis at 400 mA/cm$^2$ (curve b).

Figure 2:
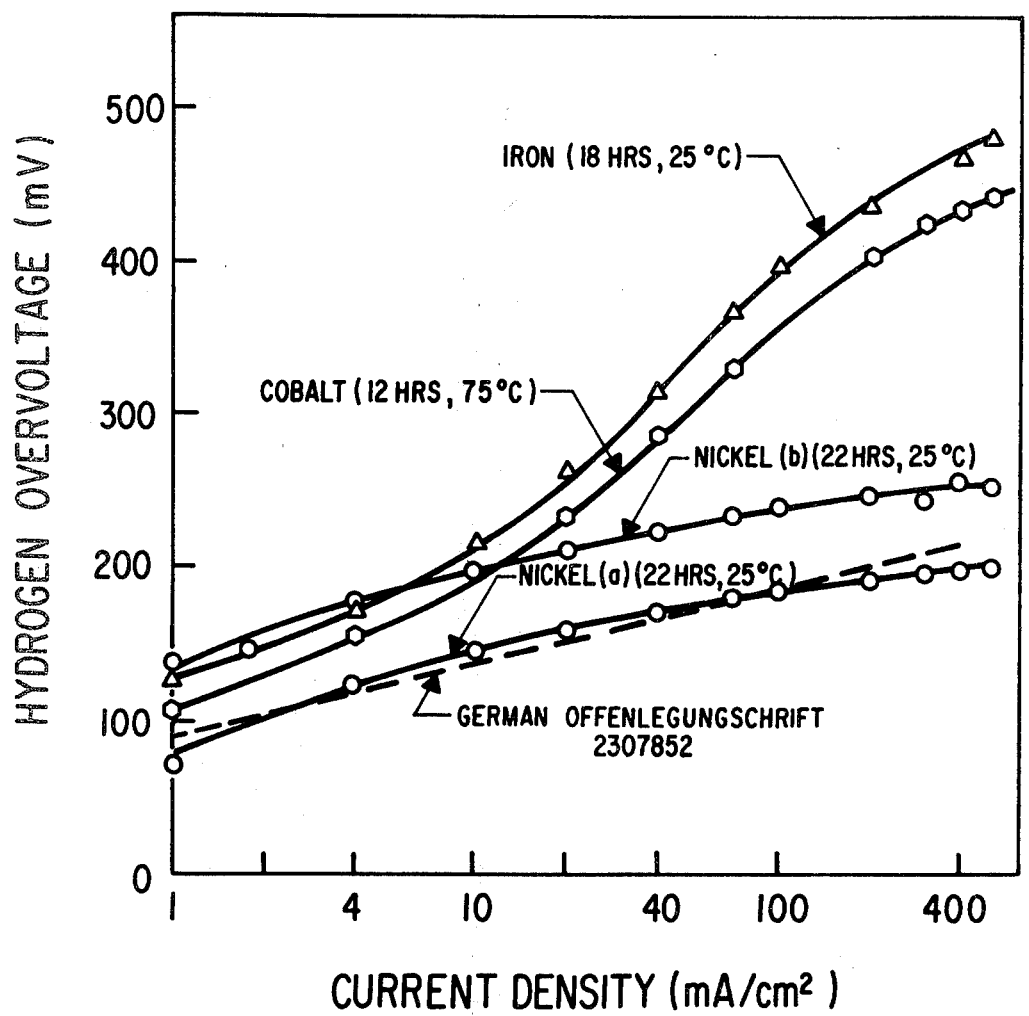
FIG. 2 illustrates hydrogen overvoltages on iron, cobalt and nickel electrodes, prepared by electroless plating from borohydrate-containing baths.

The results show that fresh nickel plated electrodes from the borohydrate bath gave overvoltages in close agreement with the patent as may be seen from the broken line in FIG. 2. The hydrogen overvoltage at 100 mA/cm$^2$ and 30° C. was approximately 190 mV. This is a 210 mV reduction from the value measured on pure iron at the same current density and temperature (FIG. 1). However, the hydrogen overvoltage increased by more than 50 mV after 16 hours electrolysis. The iron- and cobalt- borohydrate samples showed some overvoltage benefit at lower current densities, but overvoltage values rose sharply above 20 mA/cm$^2$ (FIG. 2). The results of these overvoltage measurements, together with the relative instability of the borohydrate plating baths, indicate that the requirement for a stable, low-overvoltage cathode material has not been fully satisfied by the electrode prepared in accordance with the teaching of the above patent specification.

It has been surprisingly found, in accordance with the present invention, that cathodes plated electrolytically with cobalt from a hypophosphite-containing composition can provide very substantial reduction in hydrogen overvoltage, while operating with good stability in water electrolysers. Typical plating parameters for an active cobalt cathode are recorded in the following Table I:

TABLE I

REPRESENTATIVE PLATING PARAMETERS FOR PREPARATION OF ACTIVATED COBALT CATHODES

| Bath Composition: | Cobalt Chloride CoCl$_2$ . 6H$_2$O | 50 gpl |
|---|---|---|
| | Sodium Citrate Na$_3$C$_6$H$_5$O$_7$ . 5H$_2$O | 50 gpl |
| | Ammonium Chloride NH$_4$Cl | 50 gpl |
| | Sodium Hypophosphite NaH$_2$PO$_2$ . H$_2$O | 20 gpl |
| Substrate: | 1010 Steel | |
| Operating Conditions: | pH 5–6 | |
| | Temperature 25° C. | |
| | Current Density 10–60 mA/cm$^2$ | |
| | Time 10–60 minutes | |

Figure 3:
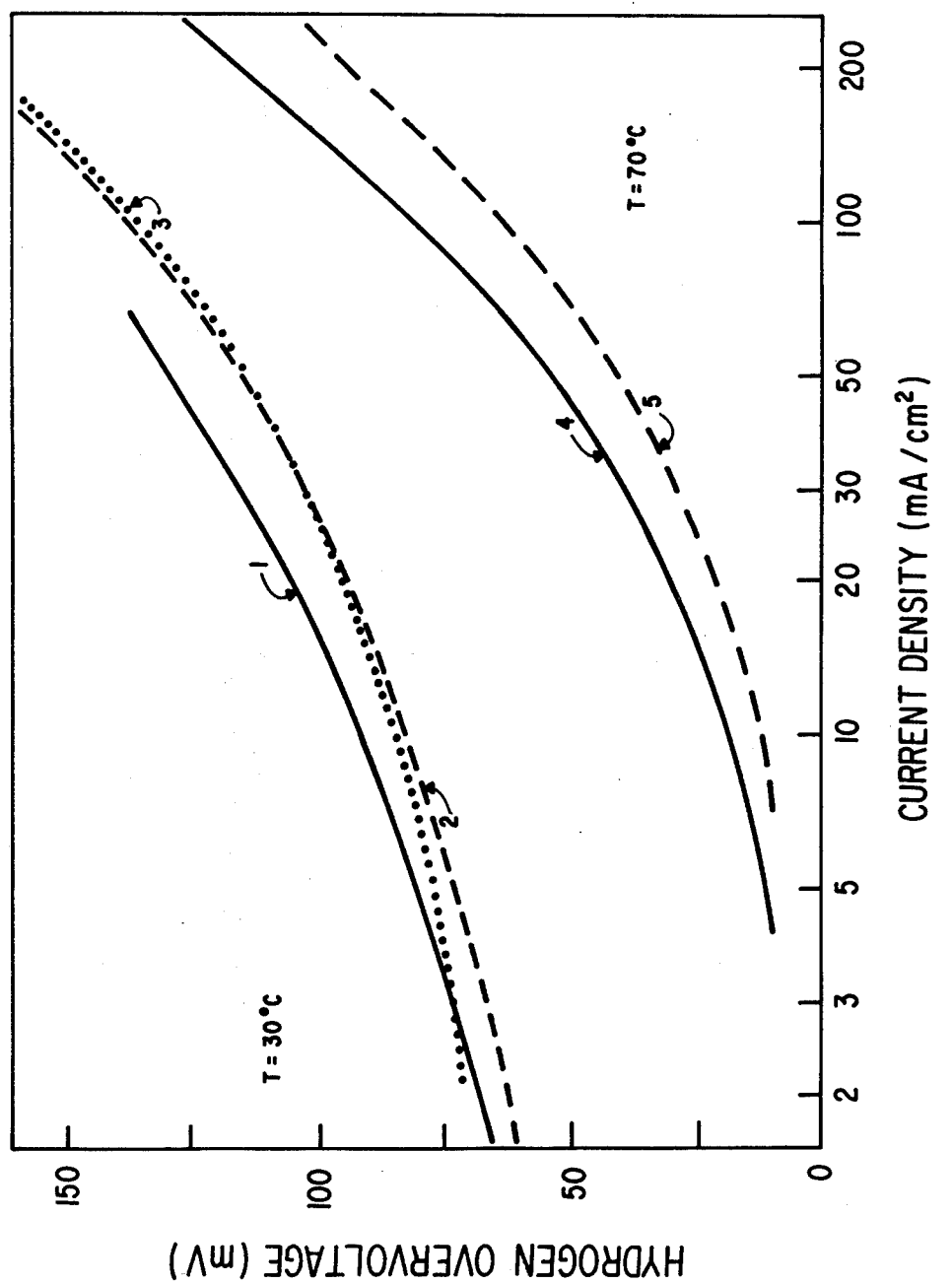
FIG. 3 illustrates the variation of hydrogen overvoltage with current density on an electrode plated with cobalt by the method of this invention.

A typical cobalt electrode was plated from this composition at a current density of 12 mA/cm$^2$ for 30 minutes. A polarization characterization was carried out on the resulting low-overvoltage material and the results are summarized in FIG. 3 which illustrates the variation of hydrogen overvoltage with current density on a cobalt plated electrode. On initial immersion in the test electrolyte, the cobalt-plated cathode was conditioned at 400 mA/cm$^2$ and 30° C. for 5 minutes. The first polarization curve, labelled 1, was then run proceeding from high current to low current and back again. These two traces (low to high, and high to low) were virtually superimposable, illustrating the reversibility of this electrode. The electrode was then held at 40 mA/cm$^2$ for two hours, and the second polarization curve (labelled 2) was run. This showed a 10 to 15 mV reduction in overvoltage, a result which has been found to be typical of the active cobalt cathode materials. The curve labelled 3 was obtained after 16 hours electrolysis at 400 mA/cm$^2$, and it indicates that the electrode has not degraded during this period. This is in marked contrast to the 50 mV increase in overvoltage observed on an active nickel electrode plated from a borohydride bath (FIG. 2). Curve 4 in FIG. 3 was obtained after heating the electrolyte to 70° C., and curve 5 was a repeat at 70° C. following 2 hours electrolysis at 40 mA/cm$^2$. The same sample was retested at 70° C. after 2-week's air exposure, and the result essentially duplicated curve 5. This curves 3 and 5 represent the stable voltage-current characteristics of this active cobalt material at 30° and 70° C. respectively.

Figure 4:
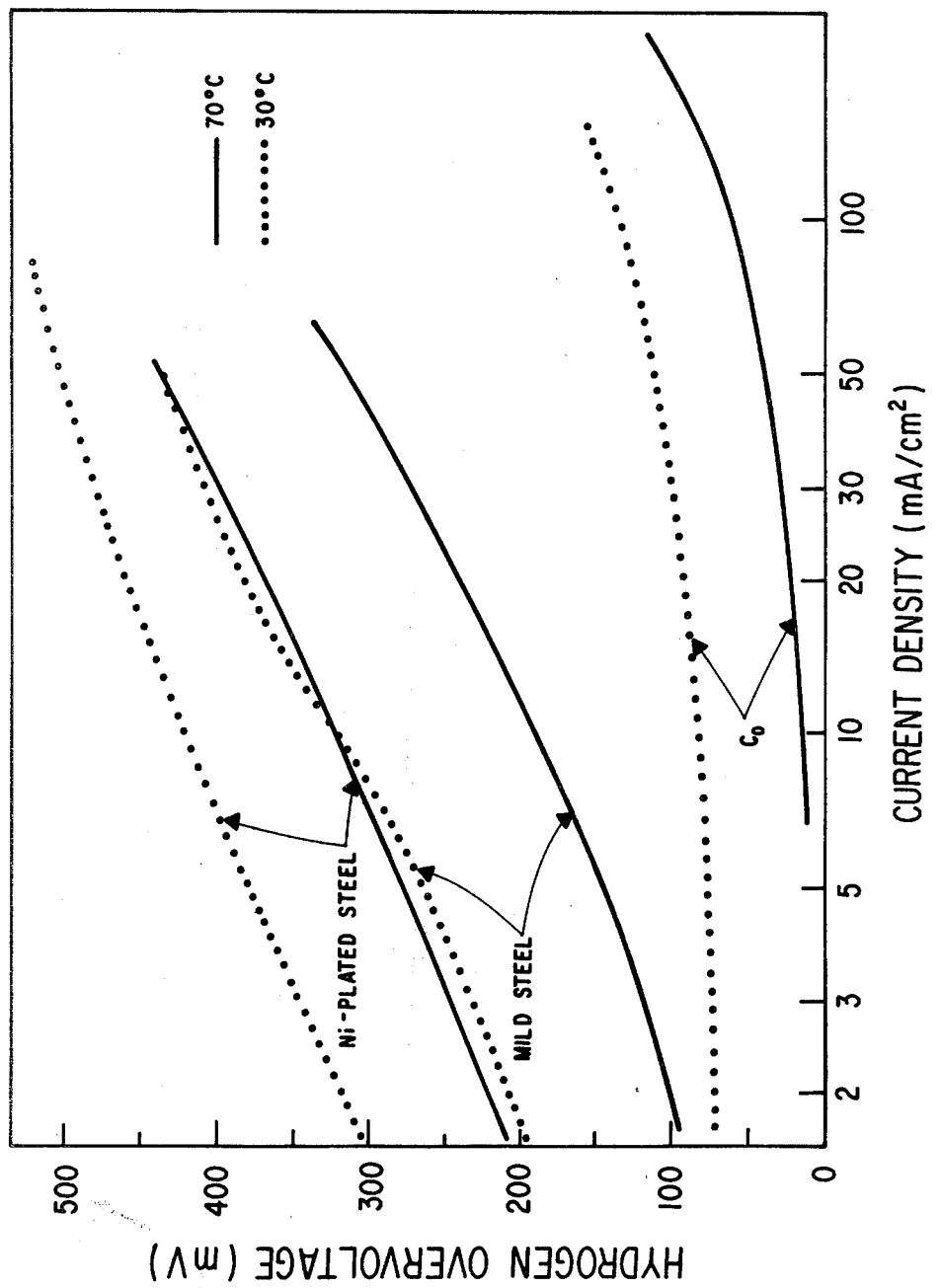
FIG. 4 illustrates a comparison of the hydrogen overvoltage characteristics of nickel-plated steel, mild steel, and active cobalt plated steel, at 70° C. and 30° C. in 28% KOH electrolyte.

FIG. 4 compares the absolute hydrogen overvoltage values on the active cobalt of this invention with values on mild steel and nickel-plated steel at 70° C. and 30° C. At 100 mA/cm$^2$, the reduction in hydrogen overvoltage at 70° C. is greater than 250 mV in comparison with the value on the mild-steel material in present commercial cathode use. No previously known non-noble metallic material offers a reduction in hydrogen overvoltage of this magnitude.

Figure 5:
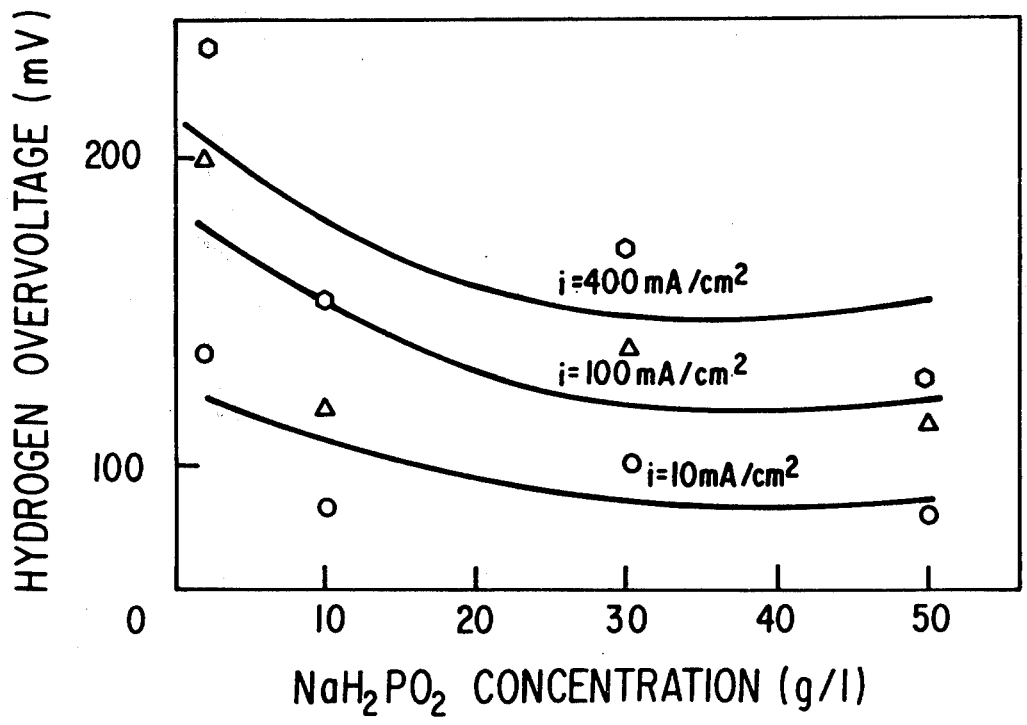
FIG. 5 illustrates representative polarization data for hydrogen evolution on cobalt electrodes prepared according to the present invention, using different concentrations of sodium hypophosphite.

Hypophosphite ion is an essential ingredient in the above disclosed active plating composition. Electrodes were prepared from the composition of Table I using four different hypophosphite concentrations. Representative data from polarization measurements on these samples are presented in FIG. 5. A concentration of 2 gpl sodium hypophosphite is too low for maximum effectiveness in reducing the hydrogen overvoltage, and little further benefit is gained by increasing the concentration above 30–40 gpl. Results obtained on plating from these four compositions in a Hull Cell are summarized in the following Table II:

TABLE II

Results of Hull-Cell Tests on Cobalt Deposits Prepared from Different Hypophosphate Concentrations

| Sodium Hypophosphite Concentration | Deposit Condition |
|---|---|
| 2 gpl | Bright deposit from 0.2 to 100 mA/cm$^2$ |
| 10 gpl | Bright deposit from 0.2 to 25 mA/cm$^2$ Dull deposit from 25 to 100 mA/cm$^2$, deposit shown to be highly porous by ink absorption test. |
| 30 gpl (TEPA) | Bright deposit from to 15 mA/cm$^2$ Dull deposit from 15 to 100 mA/cm$^2$ |
| 50 gpl Tartarate | Dull deposit at all current densities. Above 30 mA/cm$^2$ powdery deposit forms on surface. |

Sensitivity of the deposit quality to current density was observed to increase with increasing hypophosphite concentration. In view of these results, the sodium hypophosphite concentration should be in the range of 2 to 50 gpl, and preferably in the range of 10 to 30 gpl. Of course other hypophosphite salts could be used and the optimum concentration may vary with the hypophosphite salt used. The hypophosphite constituent may also be replaced by phosphite salts, formaldehyde and hydrazine.

Figure 6:
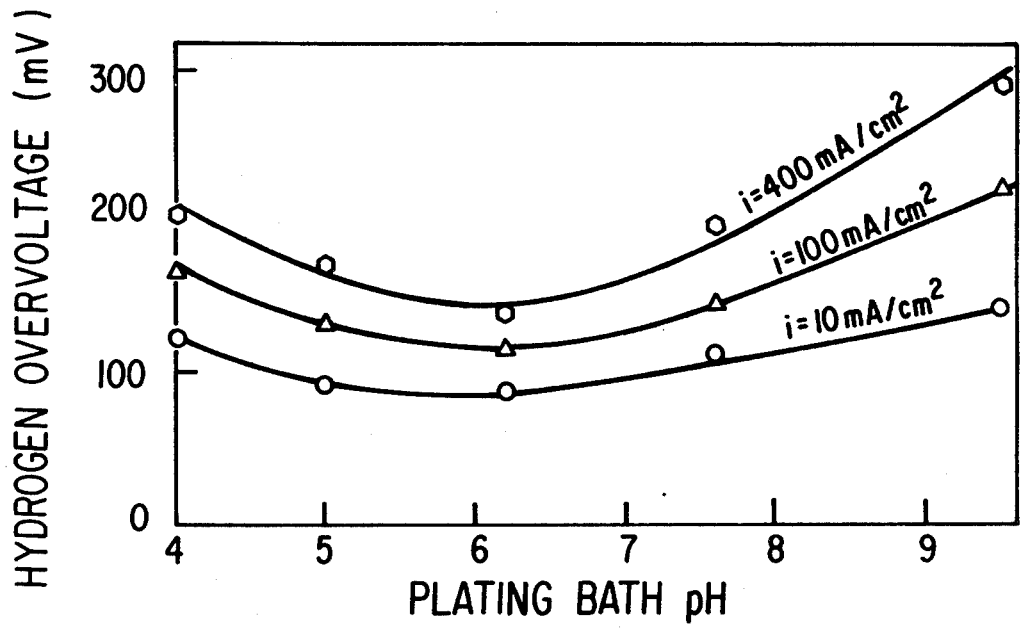
FIG. 6 illustrates representative polarization data for hydrogen evolution on cobalt electrodes prepared according to the present invention at different pH values.

A study of the effect of solution pH, summarized in FIG. 6, shows that optimum plating conditions are obtained at a pH between 5 and 7, although a range of between pH 3 and 10 may be envisaged. The unadjusted pH of the plating bath of Table I is approximately 6.3.

Electrode samples were prepared from plating baths operating at 25° C., 45° C. and 65° C. Polarization results on electrodes prepared at the two lower temperatures were comparable, while overvoltages were found to be much as 50 mV higher on electrodes plated at 65° C. A plating temperature range of between 20° C. and 80° C. is, therefore, envisaged with 25° C. to 45° C. being the preferred range.

Figure 7:
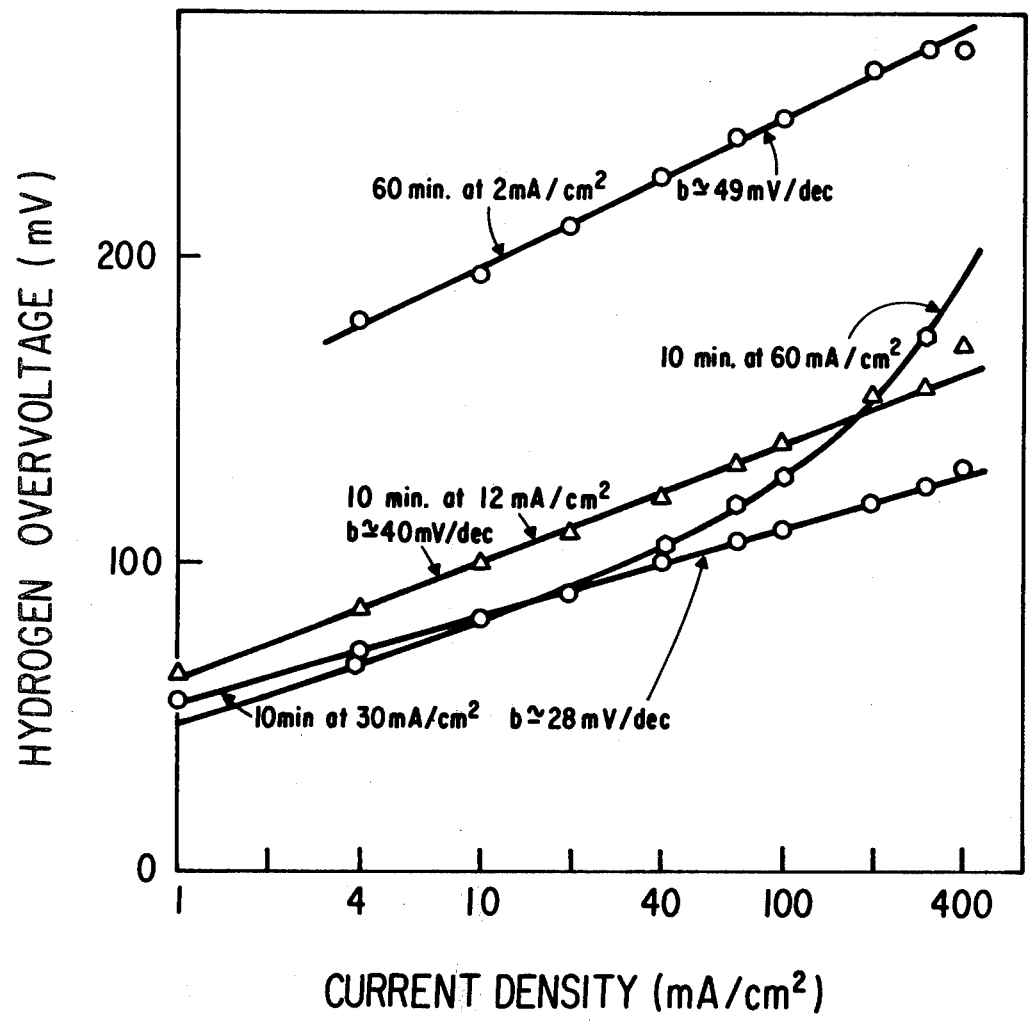
FIG. 7 illustrates hydrogen overvoltages on active cobalt electrodes plated at various current densities.

The effects of plating current density are different for different bath compositions. Results of polarization measurements are recorded in FIG. 7 for samples plated from baths having the composition of Table I. The results all show a low Tafel slope (b less than 50 mV/decade) which is characteristic of the active cobalt electrodes. The optimum plating current density range is from 5 to 60 mA/cm$^2$. At low plating current density (2 mA/cm$^2$ in FIG. 7) the hydrogen overvoltage is higher over the entire operating current density range. At higher plating rates (60 mA/cm$^2$ in FIG. 7) the hydrogen overvoltage increased at operating current densities greater than 50 mA/cm$^2$. These observations have been substantiated by measurements on other electrodes plated from similar bath compositions. Of course this higher current density result should not be seen in any way as limiting the present invention. It is likely that good activation could be achieved at much higher current densities, using suitable organic additives, a slurried plating bath, increased agitation, or other techniques known in the art.

Electrode samples were prepared using the bath composition of Table I from which ammonium chloride was omitted. Resulting deposits had an acceptable metallic appearance, but showed some loss of activity with time in the KOH electrolyte. Thus, the ammonium ion or an equivalent species is desirable but not essential to the invention. It most likely acts as a complexing agent for ionic cobalt and enhances the conductivity of the plating formulation.

Sodium citrate is present in the plating bath formulation (Table I) as a complexing agent. Its omission was found by Hull-cell tests to seriously narrow the range of acceptable plating current densities, with deposits above 18 mA/cm$^2$ being dull or burnt. Several alternate complexing agents were substituted for sodium citrate with the results summarized in the following Table III:

TABLE III

Results of Hull-Cell Tests on Cobalt Deposits Prepared from Plating Formulations Containing Various Complexing Agents

| Complexing Agent* | Deposit Conditions |
|---|---|
| None | Bright deposit from 0.2 to 18 mA/cm$^2$ Dull deposit from 18 to 37 mA/cm$^2$ Burnt deposit from 37 to 100 mA/cm$^2$ |
| Boric Acid | Deposit burnt above 10 mA/cm$^2$ |
| Disodium salt of EDTA | No deposit obtained |
| Tetraethylene Pentamine (TEPA) | No deposit obtained |
| Glycerol | Bright deposit from 0.2 to 100 mA/cm$^2$ |
| Sodium Oxalate | Bright deposit from 0.2 to 100 mA/cm$^2$ |
| Sodium Potassium Tartarate | Bright deposit from 0.2 to 100 mA/cm$^2$ |

*Composition in each case was that of Table I, with only the sodium citrate being substituted.

Boric acid-containing baths gave unacceptable (burnt) deposits, while use of the stronger complexing agents, disodium ethylene-diaminetetracetic acid (EDTA) and tetraethylene pentamine (TEPA) resulted in no deposit whatever being obtained. Several weaker complexing agents gave good results, comparable to those obtained with sodium citrate. These materials included glycerol, sodium oxalate, sodium potassium tartarate, and related compounds. Hydrogen overvoltages were comparable on samples prepared from formulations including the three named compounds. Thus, the plating formulation should contain a complexing agent of suitable strength, such as sodium or potassium salts of organic acids such as oxalic, citric, tartaric, hydroxyacetic and succinic, polyhydroxyalcohols such as glycerine and glycol, and related compounds.

Electrode samples plated with the active cobalt composition show good activity whether or not they are annealed. Suitable annealing can give improved long term performance of the cathodes, as it will be mentioned later, but this is not an essential feature of the present invention.

In summary, a wide range of plating parameters can give active cobalt electrodes having exceptional activity in comparison to pure iron, nickel, or cobalt metal. To illustrate this, a range of typical plating compositions is indicated in the following Table IV:

TABLE IV
BASIC ACTIVE COBALT PLATING COMPOSITIONS

| Designation | Composition (gpl) | | | | Plating Conditions | |
|---|---|---|---|---|---|---|
| | $CoCl_2 \cdot 6H_2O$ | $NH_4Cl$ | Sod. Citrate | $NaH_2PO_2H_2O$ | pH* | Temp(°C.) |
| A | 30 | 50 | 100 | 10 | 6.3 | 25 |
| B | 50 | 50 | 50 | 20 | 5.2 | 25 |
| C | 30 | 50 | 35 | 20 | 9.5 | 25 |
| D | 30 | 50 | 100 | 10 | 9.5 | 25 |

*pH was adjusted with dilute $NH_4OH$ solution.

Measurements of hydrogen overvoltages at 40 and 400 mA/cm² are recorded for samples plated from these baths at different current densities and for different times in the following Table V:

TABLE V
POLARIZATION ANALYSIS OF ACTIVE COBALT CATHODES AT 70° C.

| Sample Description | | Plating Conditions | | Hydrogen Overvoltage (mV)* | |
|---|---|---|---|---|---|
| Material | Plating Bath | Current Density (mA/cm²) | Time (min) | At 40 mA/cm² | At 400 mA/cm² |
| Nickel Foil | — | — | — | 360 | 490 |
| Cobalt Foil | — | — | — | 300 | 430 |
| Cobalt | A | 2 | 60 | 50 | 82 |
| Cobalt | A | 12 | 10 | 22 | 54 |
| Cobalt | A | 12 | 60 | 21 | 50 |
| Cobalt | A | 60 | 10 | 19 | 32 |
| Cobalt | B | 2 | 60 | 105 | 186 |
| Cobalt | B | 12 | 10 | 36 | 67 |
| Cobalt | B | 30 | 10 | 16 | ~39 |
| Cobalt | B | 60 | 10 | 20 | ~51 |
| Cobalt | C | 60 | 10 | 49 | 97 |
| Cobalt | D | 60 | 10 | 28 | 55 |
| Cobalt | A (Electroless) | — | 210 | 125 | 264 |
| Nickel | A (Electroless) | — | 10 | 169 | 292 |
| Nickel | Borohydride | — | 22 hrs | 96 | 159 |
| Mild Steel | — | — | — | 242 | 353 |

*Test electrolyte is 28% KOH at 70° C.

of reducing agents which can be used. Results are summarized in the following Table VI:

TABLE VI
EFFECT OF SUBSTITUTION FOR SODIUM HYPOPHOSPHITE ON PERFORMANCE OF COBALT ELECTRODES PLATED FROM COMPOSITION A (TABLE IV)

| $Na H_2PO_2$ Substitute | Plating Conditions | | Hydrogen Overvoltage (mV) | | |
|---|---|---|---|---|---|
| | Current Density (mA/cm²) | Time (minutes) | 40 mA/cm² | 100 mA/cm² | 400 mA/cm² |
| $Na H_2PO_2$ | 12 | 10 | 22 | 33 | 54 |
| $H_3PO_3$ | 12 | 10 | 112 | 132 | 162 |
| $Na_3PO_4$ | 12 | 10 | 282 | 335 | 415 |
| Hydrazine ($N_2H_2$) | 12 | 10 | 158 | 187 | 229 |
| Formaldehyde | 60 | 10 | 115 | 143 | 185 |

Active cobalt electrodes were plated from the composition A of Table IV with the sodium hypophosphite With a single exception (the electrode plated at 2 mA/cm²), all of the cobalt electrodes plated electrolytically from hypophosphite-containing baths show sharply reduced hydrogen overvoltage values in comparison with those on electroless plated samples or on unplated nickel, cobalt, or mild steel.

The activity of the cobalt plated electrodes of this invention is believed to be due at least in part to the presence of cobalt-phosphorous compounds in the deposit, although this has not been conclusively demonstrated. It is also possible that sodium hypophosphite, being a strong reducing agent, promotes formation of a cobalt deposit in a highly active physical form. Of course, any analogous salts and hypophosphorous acid, are expected to be equally active.

Experiments were carried out to delineate the defining parameters of this invention, in particular the range constituent replaced by phosphorous acid, sodium phosphate, formaldehyde and hydrazine. The results indicate that phosphorous acid, formaldehyde and hydrazine impart some activity to the electrode although the recorded hydrogen overvoltage values are substantially greater than that on active cobalt plated from a hypophosphite-containing bath. Cobalt plated from the bath in which sodium hypophosphite has been substituted by sodium phosphate showed no activity whatever. Of course phosphite salts could be substituted for phosphorus acid. Of course other addition can be used in the plating composition to obtain particular results or deposit properties. For example some organic additive such as thiourea and many others are known to improve the throwing power of the bath for complex electrode structures. Also small quantities of other metal ions may be added to the plating bath to achieve desired properties within the scope of the invention. For example an electrode was prepared from a composition parallel to that of Table I having 5% of the cobalt ions replaced by nickel ions. Equivalent activity was obtained, plus some indications of improved stability.

Because of its low cost, stability in alkali, and high strength, mild steel is the preferred substrate for plating cobalt thereon. However many situations may be envisaged where alternate substrates would be desirable and economic. For example, nickel substrates may be used in electrochemical equipment operating at higher temperature where steel would not be stable enough. Very high surface-area substrates such as fibrous graphite may also be used to enhance activity. For example, applicant has plated the composition of Table I onto a fibrous graphite material, and observed even greater activity than that found with mild steel substrates. For example, the graphite substrate samples gave a hydrogen overvoltage of 25 mV at a test current density of 100 mA/cm$^2$ compared to 50 mV on active cobalt plated on a mild steel substrate and 350 mV on unplated mild steel at the same current density. The test electrolyte was 28% w/w KOH at 70° C.

Many other high-surface area materials could of course be used, such as sintered metals, conductive oxides, and substrates prepared by plating of alloys and subsequent dissolution of one component as disclosed in U.S. Pat. No. 3,272,728 issued Sept. 13, 1966.

The long-term performance of two of the active cobalt electrodes is compared in FIG. 8 with the results for mild steel, at a test current density of 500 mA/cm$^2$. Electrodes B had the composition of Table IV and was plated at 60 mA/cm$^2$ for 10 min. while electrode A also had the composition of Table IV but was plated at 12 mA/cm$^2$ for 120 min. and further annealed at 280° C. for 30 min. Both electrodes show excellent indications of stability.

It has been found that annealing the electrode after plating relieves the stress in the plated deposits and improves the bond to the substrate, thus improving the long-term stability of the electrode. Annealing may be done in air and in nitrogen environments as well as in vacuum at about 280° C. for a few minutes up to a few hours.

Plating of metallic deposits with pulsed direct current also resulted in improved adhesion and long-term stability in comparison with deposits prepared using uninterrupted direct current. The principal factor in this improvement is believed to be that deposition initiates on different nucleation sites for each current pulse. FIG. 9 records a typical plating sequence for an active cobalt electrode using the A composition (Table IV). Plating was carried out at 24 mA/cm$^2$, with a current cycle characterized by 8 seconds on and 4 seconds off. The cathode potential during plating is recorded against a Calomel reference electrode. The initial plating potential on the cycle is approximately 100 mV more negative than the asymptotic value. This deposition overvoltage is related to the energy of nucleation and associated with the catalytic activity of the resulting deposit. By the third 8-second cycle, the deposition overvoltage approached a constant value. Comparison is made in the right hand side of FIG. 9 with the deposition potential for a non-active cobalt plating formulation. This was a bath containing 312.5 grams CoSO$_4$.5HO$_2$ and 19.6 grams NaCl per liter of water, plus boric acid to saturation. No nucleation overvoltage was observed in this case.

Although the electrode in accordance with the invention has been disclosed with reference to its use in water electrolyser cells, it is to be understood that it may be used in any caustic electrolyte such as found in chloroalkali cells and fuel cells, for example.

What is claimed is:

1. A method of producing a cobalt plated electrode having a low overvoltage for the evolution of hydrogen from aqueous electrolytes comprising subjecting an electrically conductive substrate to electrolyte plating at a current density in the range of 0.2 to 150 mA/cm$^2$ in an aqueous bath containing cobalt ions and a reducing agent selected from the group consisting of hypophosphite salts, phosphite salts, formaldehyde and hydrazine in the concentration of 2 to 100 gpl said aqueous bath having a pH in the range of 3 to 10 and being maintained at a temperature between 20° and 80° C.

2. A method as defined in claim 1, wherein ammonium ions and a weak complexing agent are added to the plating bath.

3. A method as defined in claim 2, wherein the ammonium ions are provided by ammonium chloride at a concentration of between 10 and 100 gpl.

4. A method as defined in claim 3, where the ammonium chloride is at a concentration of about 50 gpl.

5. A method as defined in claim 4, wherein the complexing agent is selected from the group consisting of sodium or potassium salts of organic acids such as oxalic, citric, tartaric hydroxyacetic and succinic, and polyhydroxyalcohols such as gylcerine and glycol.

6. A method as defined in claim 5, wherein the concentration of the complexing agent is in the range of 10 to 200 gpl.

7. A method as defined in claim 6, wherein the concentration of the complexing agent is in the range of 50 to 100 gpl.

8. A method as defined in claim 1, wherein the reducing agent is sodium hypophosphite at a concentration in the range of 2 to 100 gpl.

9. A method as defined in claim 8, wherein the sodium hypophosphite concentration is in the range of 10 to 30 gpl.

10. A method as defined in claim 1, wherein the cobalt ions are produced by CoCl$_2$.6H$_2$O at a concentration of 5 to 150 gpl.

11. A method as defined in claim 10, wherein the CoCl$_2$.6H$_2$O concentration is between 30 and 50 gpl.

12. A method as defined in claim 1, wherein the pH of the plating bath is between 5 and 7.

13. A method as defined in claim 1, wherein the temperature of the bath is in the range of 25° to 45° C.

14. A method as defined in claim 1, wherein the current density is in the range of 10 to 80 mA/cm$^2$.

15. A method as defined in claim 1, further comprising the step of annealing the electrode after plating to relieve the stress in the plated deposits and improve adhesion to the substrate, thus improving the stability of the electrode.

16. A method as defined in claim 1, wherein plating is done by means of pulsed direct current to improve adhesion and long-term stability of the plated deposits.

17. An improved method of minimizing hydrogen overvoltage during electrolysis in a caustic electrolyte, said method comprising the steps of: providing a cobalt plated electrode which has been electrolytically plated in an aqueous bath maintained at a temperature between 20° and 80° C.; and providing said bath with cobalt ions and a reducing agent selected from the group consisting of hypophosphite salts, phospite salts, formaldehyde and hydrazine in the concentration of 2 to 100 gpl.

18. An improved method for cobalt plating a conductive electrode for use in electrolysis processes utilizing caustic electrolytes, said processes being of the type such as the electrolysis of water to produce hydrogen gas, wherein the improved electrode operates at a low hydrogen overvoltage said improved method comprising the steps of: performing electrolytic plating on a conductive substrate in an aqueous bath containing cobalt ions and a reducing agent selected from the group consisting of hypophosphite salts, phosphite salts, formaldehyde and hydrozine in the concentration of 2 to 100 gpl, said aqueous bath being maintained at a temperature between 20° and 80° C.

* * * * *

UNITED STATES PATENT OFFICE
CERTIFICATE OF CORRECTION

Patent No. 4183790　　　　　　　　　Dated January 15, 1980

Inventor(s) Mohammad B. I. JANJUA and Rodney L. LEROY

It is certified that error appears in the above-identified patent and that said Letters Patent are hereby corrected as shown below:

Column 5, lines 25-30, the last half portion of Table II should read as follows:

| | |
|---|---|
| 30 gpl | Bright deposit from 0.2 to 15 mA/cm$^2$<br>Dull deposit from 15 to 100 mA/cm$^2$ |
| 50 gpl | Dull deposit at all current densities. Above 30 mA/cm$^2$ powdered deposit forms on surface |

Signed and Sealed this

First Day of July 1980

[SEAL]

Attest:

SIDNEY A. DIAMOND

Attesting Officer　　　Commissioner of Patents and Trademarks